(12) United States Patent
Tiemeyer et al.

(10) Patent No.: US 12,123,505 B2
(45) Date of Patent: Oct. 22, 2024

(54) MULTI-WAY VALVE

(71) Applicant: HELLA GmbH & Co. KGaA, Lippstadt (DE)

(72) Inventors: Sebastian Tiemeyer, Dortmund (DE); Verena Sundermeier, Delbrueck (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 238 days.

(21) Appl. No.: 17/842,958

(22) Filed: Jun. 17, 2022

(65) Prior Publication Data

US 2022/0316608 A1 Oct. 6, 2022

Related U.S. Application Data

(63) Continuation of application No. PCT/EP2020/083864, filed on Nov. 30, 2020.

(30) Foreign Application Priority Data

Dec. 19, 2019 (DE) ..................... 10 2019 135 041.7
Jun. 24, 2020 (DE) ..................... 10 2020 116 597.8

(51) Int. Cl.
*F16K 11/08* (2006.01)
*F16K 11/085* (2006.01)
*F16K 27/06* (2006.01)

(52) U.S. Cl.
CPC ........ *F16K 11/0856* (2013.01); *F16K 27/065* (2013.01)

(58) Field of Classification Search
CPC ........................... F16K 11/0856; F16K 27/065
See application file for complete search history.

(56) References Cited

U.S. PATENT DOCUMENTS

| 3,166,098 A | 1/1965 | Jennings |
| 4,655,252 A | 4/1987 | Krumhansl |
| 5,152,321 A * | 10/1992 | Drager ................ F16K 11/0856 |
| | | 137/625.29 |

(Continued)

FOREIGN PATENT DOCUMENTS

| DE | 112014001830 T5 | 12/2015 |
| GB | 1549100 A | 7/1979 |

OTHER PUBLICATIONS

International Search Report dated Feb. 26, 2021 in corresponding applciation PCT/EP2020/083864.

*Primary Examiner* — Kevin R Barss
(74) *Attorney, Agent, or Firm* — Muncy, Geissler, Olds & Lowe, P.C.

(57) ABSTRACT

A multi-way valve having a housing with housing openings for flow-conductive connection to an external flow channel for a fluid, and a valve body arranged in the housing so as to be rotatable about a rotation axis, for flow-conductive connection of at least two of the housing openings of the housing. A seal arranged between the housing and the valve body. The valve body has a first plane having at least one first connection channel and a second plane, arranged parallel to the first plane, having at least one second connection channel, wherein the connection channels are separate from each other in respect of flow and can each be flow-conductively connected to at least two of the housing openings by a rotation of the valve body to a previously specified rotary position of the valve body.

12 Claims, 10 Drawing Sheets

(56) References Cited

U.S. PATENT DOCUMENTS

| | | |
|---:|---:|---|
| 6,308,739 B1 | 10/2001 | Barbuto et al. |
| 10,183,548 B2 | 1/2019 | Enomoto et al. |
| 2006/0118066 A1 | 6/2006 | Martins |
| 2014/0076454 A1 | 3/2014 | Kjar |
| 2018/0372235 A1 | 12/2018 | Smith |

* cited by examiner

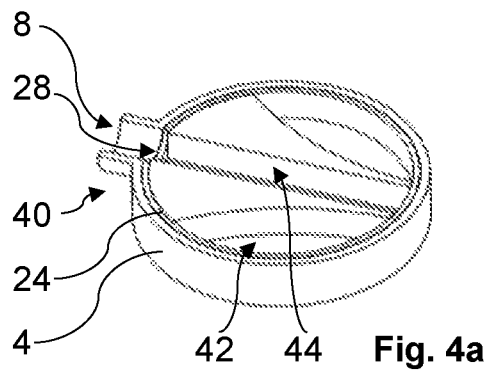 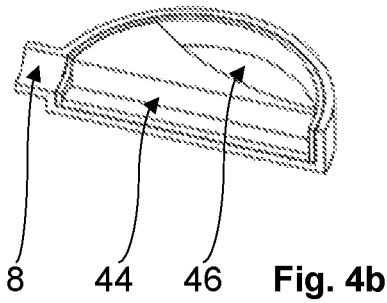
Fig. 4a        Fig. 4b
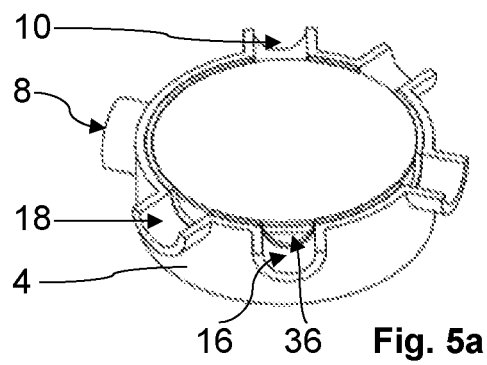 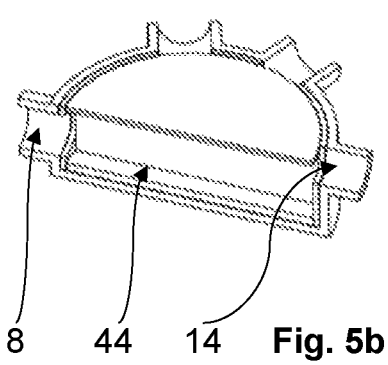
Fig. 5a        Fig. 5b
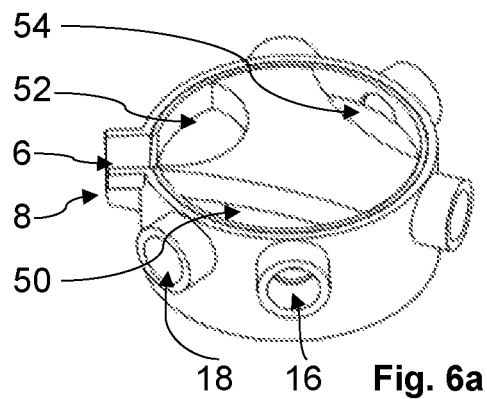 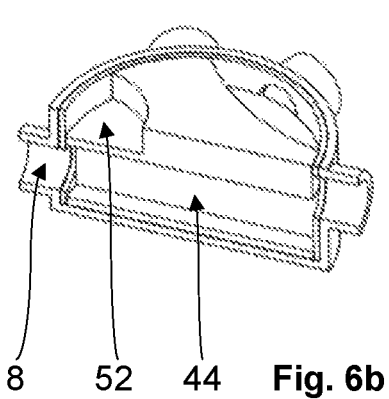
Fig. 6a        Fig. 6b
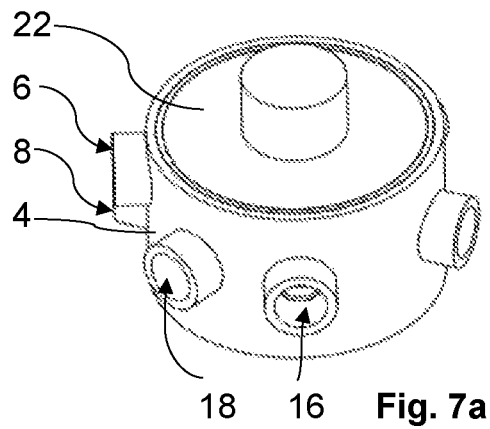 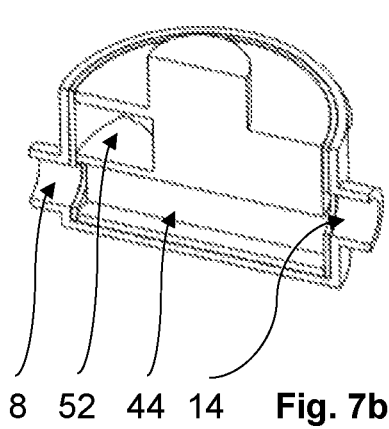
Fig. 7a        Fig. 7b

MULTI-WAY VALVE

This nonprovisional application is a continuation of International Application No. PCT/EP2020/083864, which was filed on Nov. 30, 2020, and which claims priority to German Patent Application No. 10 2019 135 041.7, which was filed in Germany on Dec. 19, 2019, and to German Patent Application No. 10 2020 116 597.8, which was filed in Germany on Jun. 24, 2020, and which are all herein incorporated by reference.

BACKGROUND OF THE INVENTION

Field of the Invention

The present invention relates to a multi-way valve.

Description of the Background Art

Multi-way valves are widely used in technology in different embodiments and are used to control complex fluid flows in a variety of applications. By means of a multi-way valve, it is possible to replace a combination of a plurality of one-way valves. For example, multi-way valves are used in the control of complex fluid systems with fluid circuits in vehicles. Newer motor vehicle concepts for land vehicles, such as hybrid or electric cars, also have such complex fluid systems with fluid circuits. The fluid circuits may be, for example, cooling circuits and/or heating circuits, wherein the same fluid circuit may be designed to be a cooling circuit and heating circuit simultaneously. Depending on the operating mode, it may be necessary to close or open, connect or disconnect fluid circuits of such a fluid system. When using conventional multi-way valves, a plurality of multi-way valves, for example 3/2 or 4/2-way valves, are required.

SUMMARY OF THE INVENTION

It is therefore an object of the present invention to improve a multi-way valve.

In an exemplary embodiment, this object is achieved by a multi-way valve having a housing having a plurality of housing openings, each for flow-conductive connection to an external flow channel for a fluid, and a valve body arranged in the housing so as to be rotatable about a rotation axis, for flow-conductive connection of at least two of the housing openings of the housing, wherein a seal having seal openings corresponding to the housing openings in the housing for sealing the flow-conductive connections from the open environment is arranged between the housing and the valve body, and wherein the valve body has a first plane having at least one first connection channel and a second plane, arranged parallel to the first plane, having at least one second connection channel, wherein the connection channels are separate from each other in respect of flow and can be flow-conductively connected to at least two of the housing openings of the housing in each case by means of a rotation of the valve body to a previously specified rotary position of the valve body. The subclaims relate to advantageous further developments of the invention.

A significant advantage of the multi-way valve according to the invention is in particular that the multi-way valve is improved. By means of the multi-way valve according to the invention, it is possible to control a plurality of external flow channels of a fluid system having, for example, a plurality of fluid circuits, in a simple manner in terms of design and circuit technology. By means of the invention, it is thus possible to replace a plurality of conventional multi-way valves with only a single multi-way valve according to the invention. Accordingly, the installation effort and costs as well as the required installation space are reduced.

Basically, the multi-way valve can be freely selected according to type, function, material, dimensioning, shape and arrangement within wide suitable limits.

The first plane can have a plurality of first connection channels, preferably three first connection channels, and/or the second plane has a plurality of second connection channels, preferably three second connection channels. In this way, the possibility of controlling, for example, a fluid system with a plurality of fluid circuits is further improved.

One of the first connection channels and/or one of the second connection channels can be formed as a central channel, wherein the remaining first connection channels and/or second connection channels are each arranged on both sides of the central channel. As a result, the aforementioned embodiment is realized in a structurally particularly simple way.

The remaining first connection channels and/or second connection channels arranged on both sides of the central channel can each be formed as a curved, preferably arc-shaped, recess of the valve body. In this way, the production of the further first connection channels and/or second connection channels is considerably simplified. Furthermore, a space-saving arrangement of the first connection channels is realized.

The first connection channels and/or second connection channels can each be formed as curved, preferably arc-shaped, recesses of the valve body. As a result, the first and/or second connection channels are realized in a structurally simple and also space-saving manner.

The valve body can have at least one third connection channel that are separate in respect of fluid flow from the first and second connection channels, wherein the third connection channel extends over the first and the second planes, preferably, that the third connection channel is formed as a central channel. By means of the at least one third connection channel, a connection of the first and the second planes and thus a connection of the housing openings assigned to these planes is thus possible in a structurally and technical simple manner.

The housing openings, the seal openings and the connection channels can be designed and arranged in such a way that the housing openings and the seal openings at least partially flow-conductively connect with the at least one first, the at least one second and the at least one third connection channel, preferably partly with the at least one first connection channel, partly with the at least one second connection channel, partly with the at least one third connection channel and partly simultaneously with the at least one first and at least one second connection channel. In this way, the multi-way valve according to the invention is even more adaptable to the respective requirements of the individual case.

The multi-way valve can be designed in such a way that three external fluid circuits are simultaneously controllable by means of the multi-way valve, wherein each of the three external fluid circuits is connected in a flow-conductive manner by means of the external flow channels to at least two different housing openings, preferably, that at least one of the three external fluid circuits has an external flow channel designed as a bypass channel for at least one component of this external fluid circuit, wherein the bypass channel is flow-conductively connected separately to one of the housing openings of the multi-way valve. This makes it possible, for example, to control even very complex fluid systems with fluid circuits only with a single multi-way valve according to the invention. This applies in particular to the preferred embodiment.

In principle, the seal can be freely selected according to type, function, material, dimensioning and arrangement within wide suitable limits.

The seal can be formed as an integral part of the housing and/or the valve body. This eliminates the need for separate warehousing and logistics as well as the installation of the seal between the housing and the valve body.

The seal can be formed as a separate component of the multi-way valve. This makes it possible to adapt the seal specifically to its sealing function, rather than having to find a compromise between the sealing function and the connection of the seal to the housing and/or the valve body when selecting the seal. Furthermore, the seal, which is designed as a separate component, can also be replaced separately.

The valve body can also be freely selected according to type, material, shape and dimensioning within wide suitable limits.

The valve body can be formed in one piece. In this way, in contrast to a valve body designed as a multi-part component, the assembly effort for the valve body is eliminated. Accordingly, the assembly effort is reduced overall. Warehousing and logistics are also further simplified.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4a shows the multi-way valve in a partial perspective representation with a view to the first plane, FIG. 4b shows the multi-way valve according to FIG. 4a in a cross-section in a perspective representation, FIG. 5a shows the multi-way valve in a partial perspective representation with a view to the first plane, FIG. 5b shows the multi-way valve according to FIG. 5a in a cross-section in a perspective representation, FIG. 6a shows the multi-way valve in a partial perspective representation with a view to the second plane, FIG. 6b shows the multi-way valve according to FIG. 6a in a cross-section in a perspective representation, FIG. 7a shows the multi-way valve in a partial perspective representation with a view to the second plane, FIG. 7b shows the multi-way valve according to FIG. 7a in a cross-section in a perspective representation and FIGS. 8a to 8f illustrate the exemplary embodiment in a simplified top view in different rotary positions of the valve body, wherein the two planes of the valve body are shown together.

DETAILED DESCRIPTION

Figure 1:
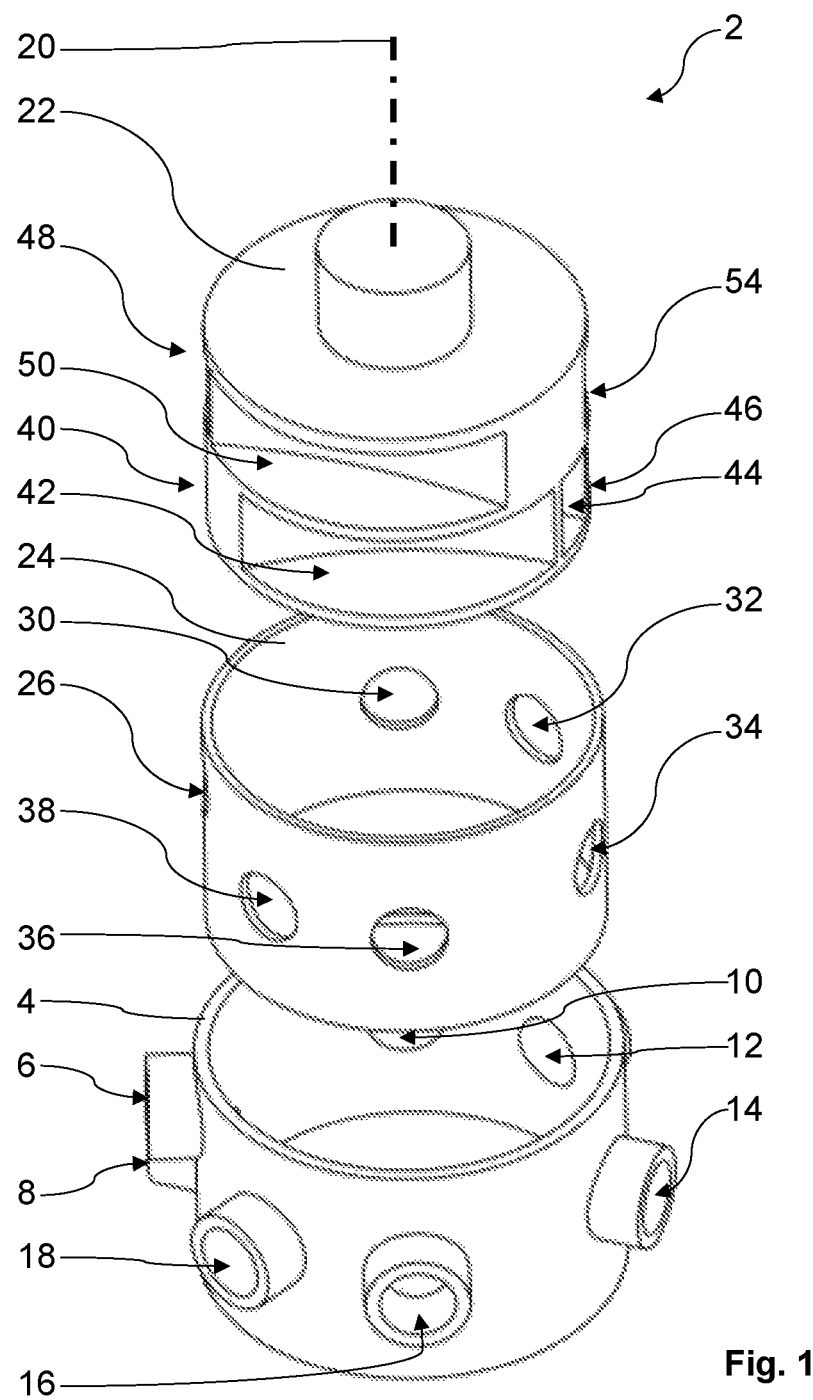
FIG. 1 shows an exemplary embodiment of the multi-way valve according to the invention in a perspective exploded view.

The multi-way valve 2 comprises a housing 4 having a plurality of housing openings 6, 8, 10, 12, 14, 16, 18, each for the flow-conductive connection to an external flow channel for a fluid and a valve body 22 arranged in a housing 4 so as to be rotatable about an axis of rotation 20, for flow-conductive connection of at least two of the housing openings 6, 8, 10, 12, 14, 16, 18 of the housing 4, wherein a seal 24 having seal openings 26, 28, 30, 32, 34, 36, 38 corresponding to the housing openings 6, 8, 10, 12, 14, 16, 18 in the housing 4 for sealing the flow-conductive connections from the open environment is arranged between the housing 4 and the valve body 22, and wherein the valve body 22 has a first plane 40 having three first connection channels 42, 44, 46 and a second plane 48, arranged parallel to the first plane 40, having three second connection channels 50, 52, 54, wherein the connection channels 42, 44, 46, 50, 52, 54 are separate from each other in respect of flow and can each be flow-conductively connected to at least two of the housing openings 6, 8, 10, 12, 14, 16, 18 of the housing 4 by means of a rotation of the valve body 22 to a previously specified rotary position of the valve body 22. The valve body 22 is designed in one piece and is automatically rotated by means of a drive, in the manner known to those skilled in the art about its axis of rotation 20 in a predetermined manner. The seal 24 is designed as a separate seal.

The present example is a multi-way valve for a land vehicle designed as a hybrid or electric vehicle, wherein by means of the multi-way valve 2 in the desired manner a plurality of different fluid circuits of a fluid system of the hybrid or electric vehicle can be controlled simultaneously, which is explained in more detail below. For example, these may be cooling circuits or heating circuits, wherein one of the fluid circuits may also be formed as both a cooling and a heating circuit.

As can be clearly seen from FIG. 4a, the first connection channel 44 is formed as a central channel, wherein the two other first connection channels 42 and 46 are each arranged on both sides of the central channel 44, and wherein the two first connection channels 42, 46 each arranged on both sides of the central channel 44 are each formed as an arc-shaped recess of the valve body 22.

In contrast, all second connection channels 50, 52, 54 are each formed as an arc-shaped recess of the valve body 22. In this respect, see in particular FIG. 6a.

Figure 3:
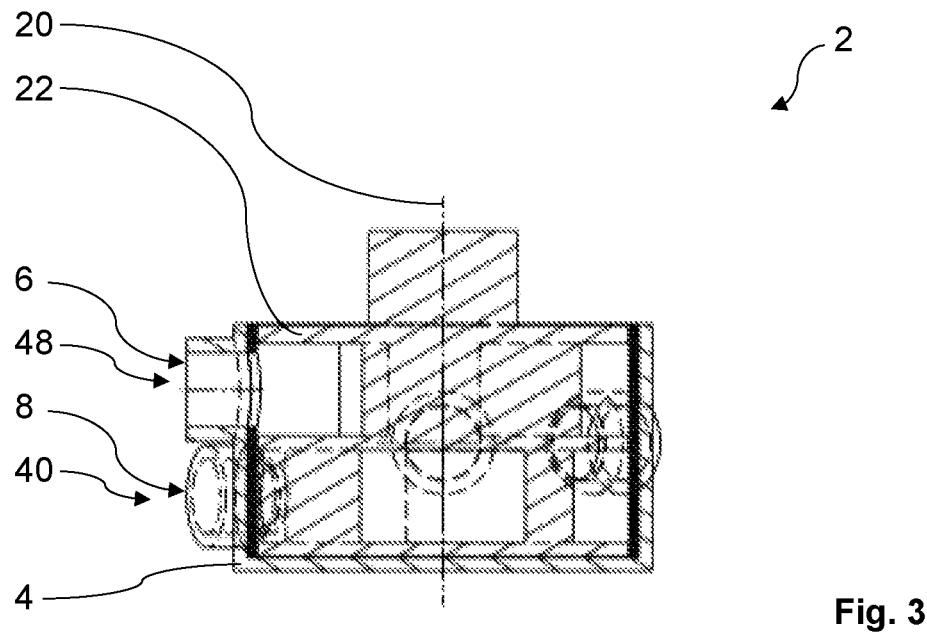
FIG. 3 shows the exemplary embodiment in a cut side view along the cutting line A-A in FIG. 2.
Figure 2:
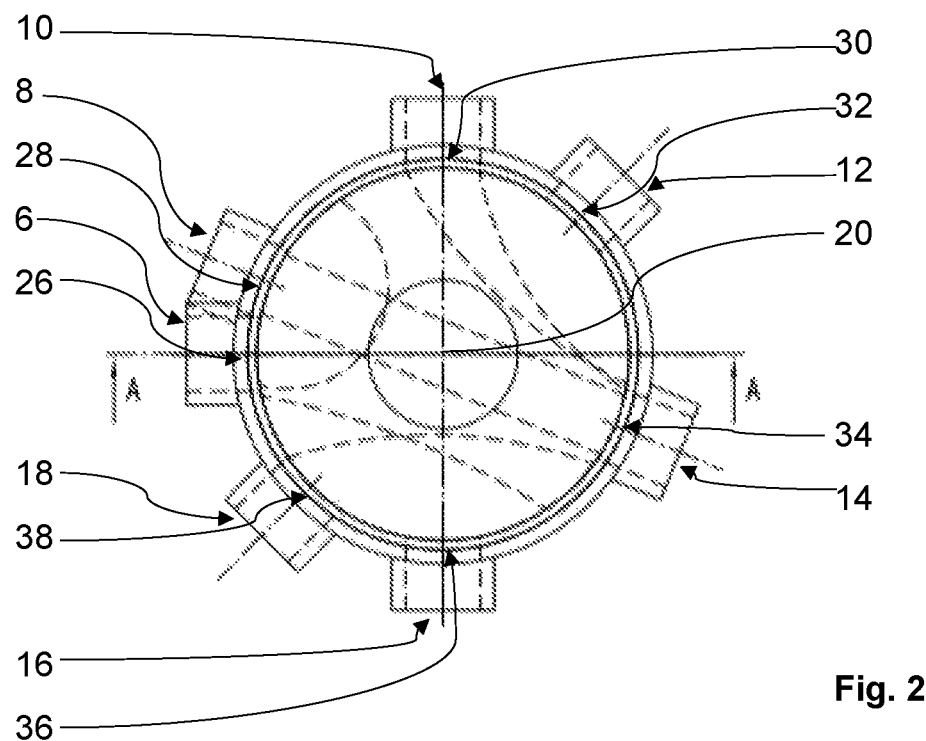
FIG. 2 shows the exemplary embodiment in a top view.

The housing openings 6, 8, 10, 12, 14, 16, 18, the seal openings 26, 28, 30, 32, 34, 36, 38 and the connection channels 42, 44, 46, 50, 52, 54 are also designed and arranged in such a way that the housing openings 6, 8, 10, 12, 14, 16, 18 and the seal openings 26, 28, 30, 32, 34, 36, 38 are at least partially flow-conductively connected to the first and the second connection channels 42, 44, 46, 50, 52, 54, namely partly to the first connection channels 42, 44, 46, partly to the second connection channels 50, 52, 54 and partly to the first and the second connection channels 42, 44, 46, 50, 52, 54. For example, in the present embodiment, the housing opening 8 with the corresponding seal opening 28 are only flow-conductively connected to the first connection channels 42, 44, 46 of the first plane 40, while the housing opening 6 with the corresponding seal opening 26 are only flow-conductively connected to the second connection channels 50, 52, 54 of the second plane 48. In this regard, see FIG. 2 in conjunction with FIG. 3 as well as FIG. 4a in conjunction with FIG. 5a and FIG. 6a in conjunction with FIG. 7a. In contrast, the remaining housing openings 10, 12, 14, 16, 18 and the corresponding seal openings 30, 32, 34, 36, 38 with the connection channels 42, 44, 46, 50, 52, 54 of both planes 40, 48 of the connection body 22 are flow-conductively connectable. In this respect, see in particular FIG. 5a.

As explained in more detail below, the multi-way valve 2 according to the present example is designed in such a way that by means of the multi-way valve 2, three external fluid circuits are controllable at the same time, wherein each of the three external fluid circuits is connected flow-conductively by means of the external flow channels to at least two different housing openings 6, 8, 10, 12, 14, 16, 18. In a preferred manner, one of the three external fluid circuits has an external flow channel formed as a bypass channel for at least one component of this external fluid circuit, wherein the bypass channel is separately flow-conductively connected to the housing opening 8 of the multi-way valve 2. In the present embodiment, the external fluid circuit having the bypass channel is thus flow-conductively connected to the multi-way valve 2, on one side via the housing opening 18 and on the other side to the housing opening 6 and, by means of the bypass channel, additionally to the housing opening 8. The other two external fluid circuits are each flow-conductively connected only to two housing openings of the multi-way valve 2, namely on the one hand one of the two external fluid circuits is flow-conductively connected to the housing openings 10 and 12 and on the other hand, the other of the two remaining external fluid circuits is connected to the housing openings 14 and 16.

In the following, the functioning of the multi-way valve according to the invention is explained in more detail according to the present embodiment based on FIGS. 1 to 8f.

In FIGS. 8a to 8f, the multi-way valve 2 is shown in different rotary positions during its rotation about the axis of rotation 20 in a top view.

The arrows in FIGS. 8a to 8f symbolize the flow direction of the fluids flowing in each case through the housing openings 6, 8, 10, 12, 14, 16, 18, the corresponding seal openings 26, 28, 30, 32, 34, 36, 38 and the first and second connection channels 42, 44, 44, 46, 50, 52, 54 of the first and second planes 40, 48 of the valve body 22, each flow-conductively connected to said seal openings. See FIGS. 1 to 7b in addition to the following explanations.

Figure 8A:
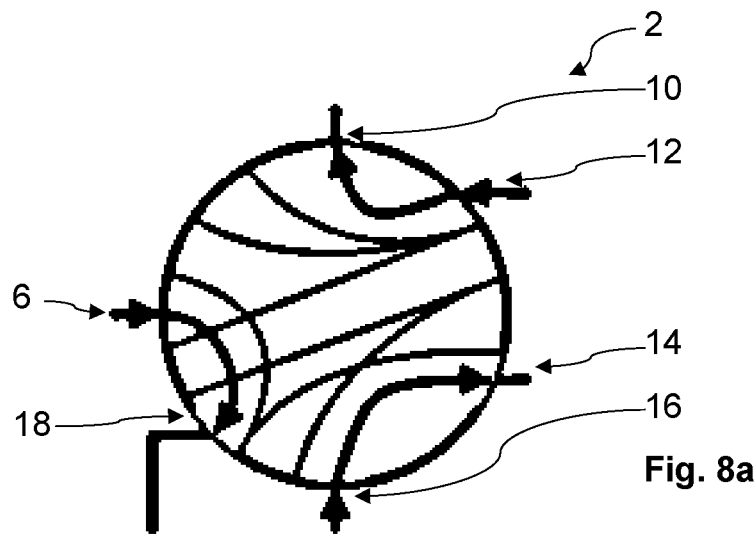

Accordingly, by means of the multi-way valve 2 in its rotary position shown in FIG. 8a, in each case the housing opening 6 and the corresponding seal opening 26 are flow-conductively connected via the second connection channel 52 to the housing opening 18 and the corresponding seal opening 38, the housing opening 12 and the corresponding seal opening 32 are flow-conductively connected via the first connection channel 46 and the second connection channel 54 to the housing opening 10 and the corresponding seal opening 30, and the housing opening 16 and the corresponding seal opening 36 are flow-conductively connected via the first connection channel 42 and the second connection channel 50 to the housing opening 14 and the corresponding seal opening 34.

Figure 8B:
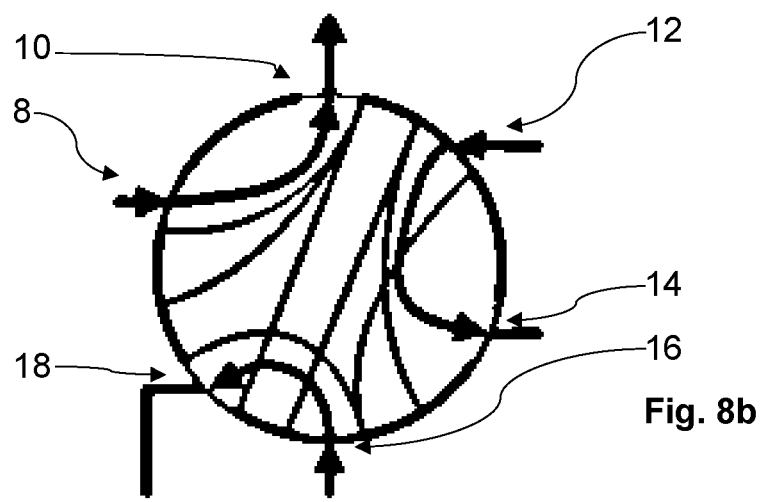

According to the rotary position of the multi-way valve 2 shown in FIG. 8b, the housing opening 8 and the corresponding seal opening 28 are each flow-conductively connected via the second connection channel 54 to the housing opening 10 and the corresponding seal opening 30, the housing opening 12 and the corresponding seal opening 32 are flow-conductively connected via the first connection channel 42 and the second connection channel 50 to the housing opening 14 and the corresponding seal opening 34, and the housing opening 16 and the corresponding seal opening 36 are flow-conductively connected via the second connection channel 52 to the housing opening 18 and the corresponding seal opening 38.

Figure 8C:
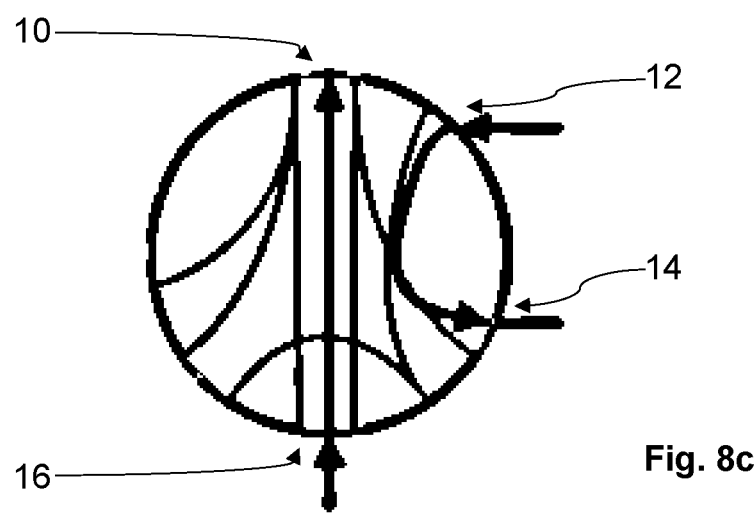

According to the rotary position of the multi-way valve 2 shown in FIG. 8c, the housing opening 16 and the corresponding seal opening 36 are flow-conductively connected via the first connection channel 44 to the housing opening 10 and the corresponding seal opening 30, and the housing opening 12 and the corresponding seal opening 32 are flow-conductively connected via the first connection channel 42 and the second connection channel 50 to the housing opening 14 and the corresponding seal opening 34.

Figure 8D:
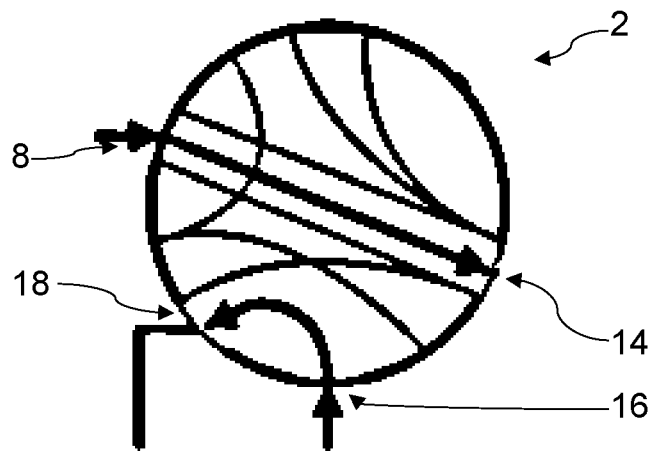

According to the rotary position of the multi-way valve 2 shown in FIG. 8d, the housing opening 8 and the corresponding seal opening 28 are each flow-conductively connected via the first connection channel 44 to the housing opening 14 and the corresponding seal opening 34, and the housing opening 16 and the corresponding seal opening 36 are flow-conductively connected via the first connection channel 42 and the second connection channel 50 to the housing opening 18 and the corresponding seal opening 38.

Figure 8E:
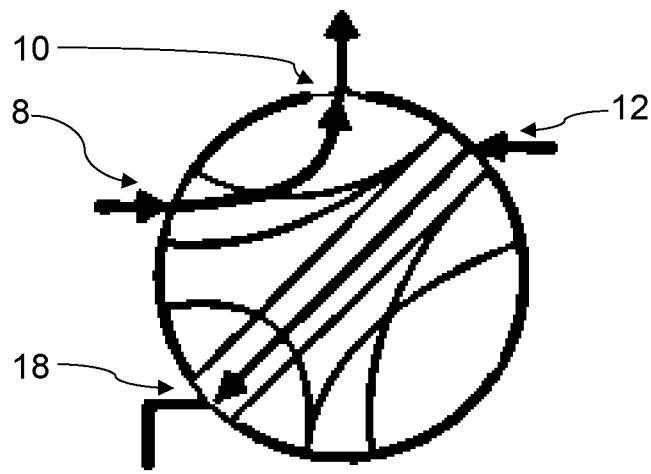

According to the rotary position of the multi-way valve 2 shown in FIG. 8e, the housing opening 8 and the corresponding seal opening 28 are each flow-conductively connected via the first connection channel 46 to the housing opening 10 and the corresponding seal opening 30, and the housing opening 12 and the corresponding seal opening 32 are flow-conductively connected via the first connection channel 44 to the housing opening 18 and the corresponding seal opening 38.

Figure 8F:
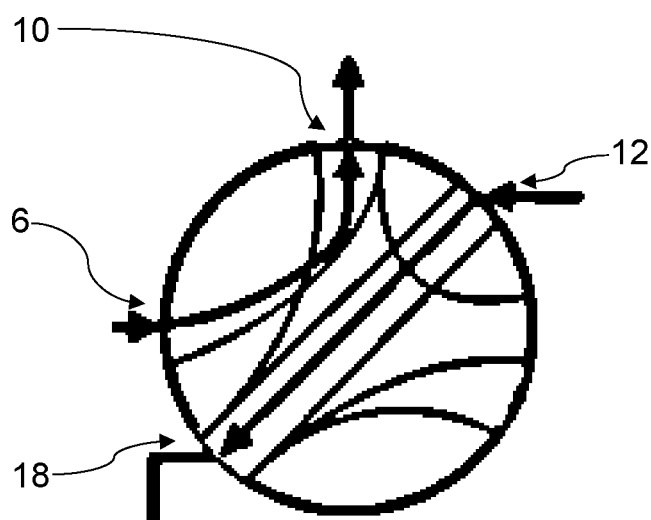
Figure 9A:
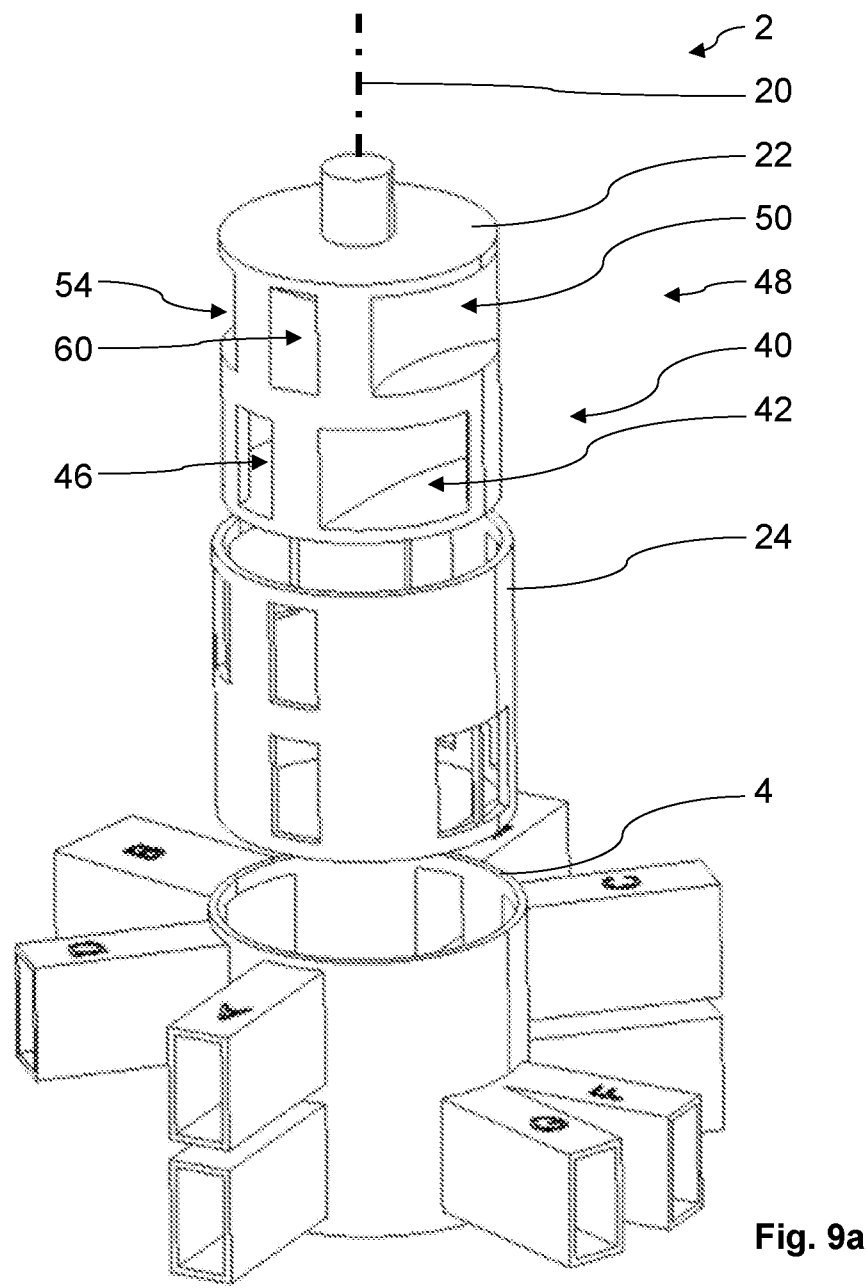
FIGS. 9a and 9b illustrate further examples of the multi-way valve according to the invention in two perspective exploded views.
Figure 9B:
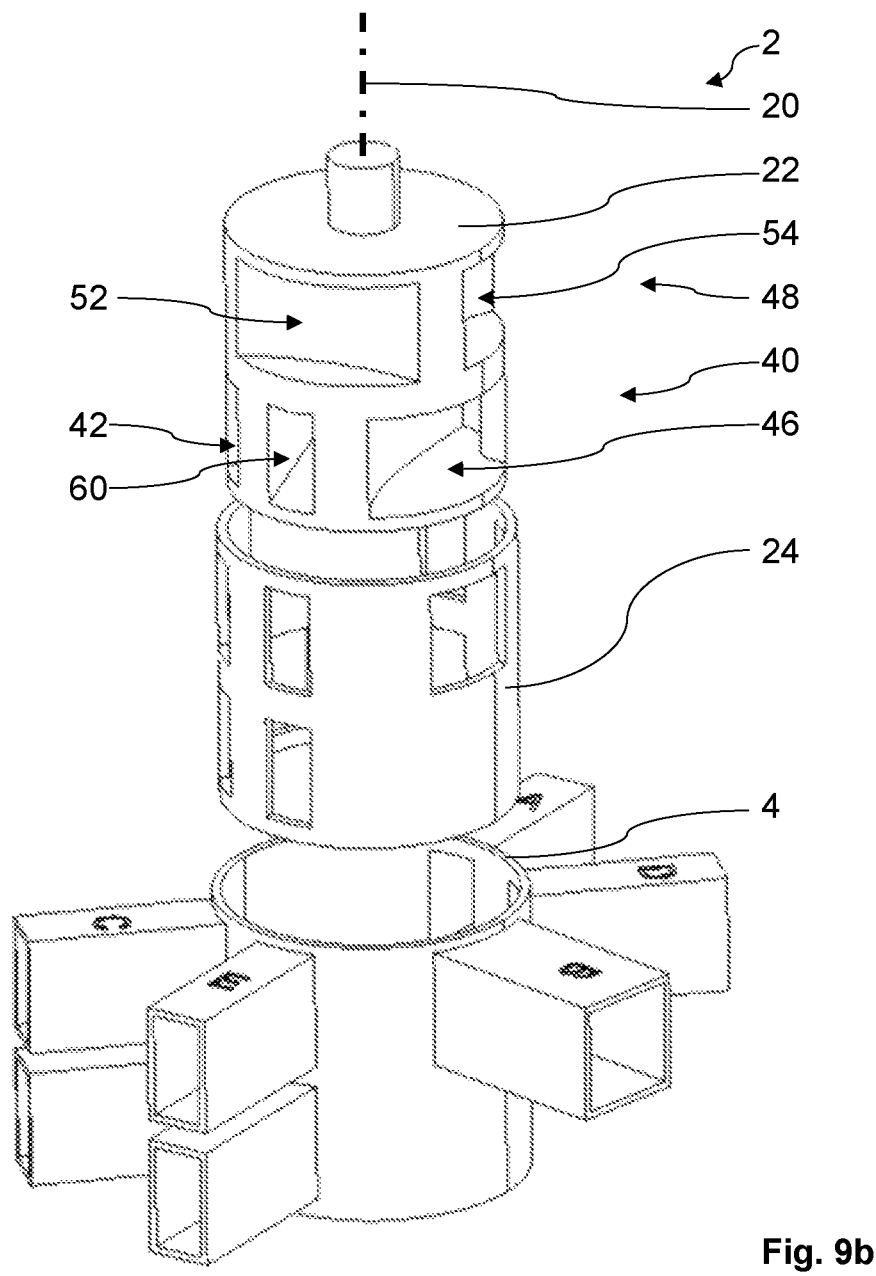

According to the rotary position of the multi-way valve 2 shown in FIG. 8f, the housing opening 6 and the corresponding seal opening 26 are each flow-conductively connected via the second connection channel 50 to the housing opening 10 and the corresponding seal opening 30, and the housing opening 12 and the corresponding seal opening 32 are each flow-conductively connected via the first connection channel 44 to the housing opening 18 and the corresponding seal opening 38.

In FIGS. 9a to 12b, a second example of the multi-way valve according to the invention is also presented.

The multi-way valve 2 of the second example is comparable with its basic structure to the multi-way valve 2 of the first example, so that here, largely reference can be made to the above explanations in respect of the first example. Accordingly, the explanations to the first and to the second example complement each other, so that, for example with regard to other examples of the invention, the details of the first and the second examples can be combined with each other in whole or in part.

The observations regarding the second example are therefore explained only to the extent of the differences to the first example. Otherwise, as already explained above, reference is made to the explanations to the first example. Identical or identically operating components are provided with the same reference signs.

Essentially, the second example differs from the first example by the number and arrangement of the housing openings, the corresponding seal openings and the first and second connection channels. Furthermore, a significant difference to the first example is that the valve body 22, instead of the first connection channel 44 formed as a central channel, has a third connection channel 60, wherein the third connection channel 60 extends over the first and the second planes 40, 48, namely such that the third connection channel 60 is formed as a central channel. Accordingly, the invention according to the second example enables other fluid-conducting connections between external flow channels of fluid circuits.

For easier orientation in FIGS. 9*a* to 12*b* and better distinguishability from the first example, the housing openings are labeled with letters as reference signs, wherein the seal openings assigned to them are not specially designated with reference signs.

The multi-way valve 2 has a total of ten housing openings here, namely housing openings A at the top, A at the bottom, B, C at the top, C at the bottom, D, E at the bottom, F and G, wherein the housing openings A at the top, B, C at the top, D and E at the top are assigned to the second plane 48 of the valve body 22 and the housing openings A at the bottom, C at the bottom, E at the bottom, F and G are assigned to the first plane 40 of the valve body 22. In this regard, see in particular FIGS. 9*a* and 9*b*. The seal openings of the seal 24 correspond to the aforementioned housing openings and are therefore not explicitly labeled. In contrast to the first example, in the present embodiment no housing openings are assigned to either the first plane 40 or the second plane 48 of the valve body 22.

In FIGS. 10*a* to 12, the multi-way valve 2 of the second example is shown in an assembly position, i.e., in the assembled state of the multi-way valve 2.

Figure 10A:
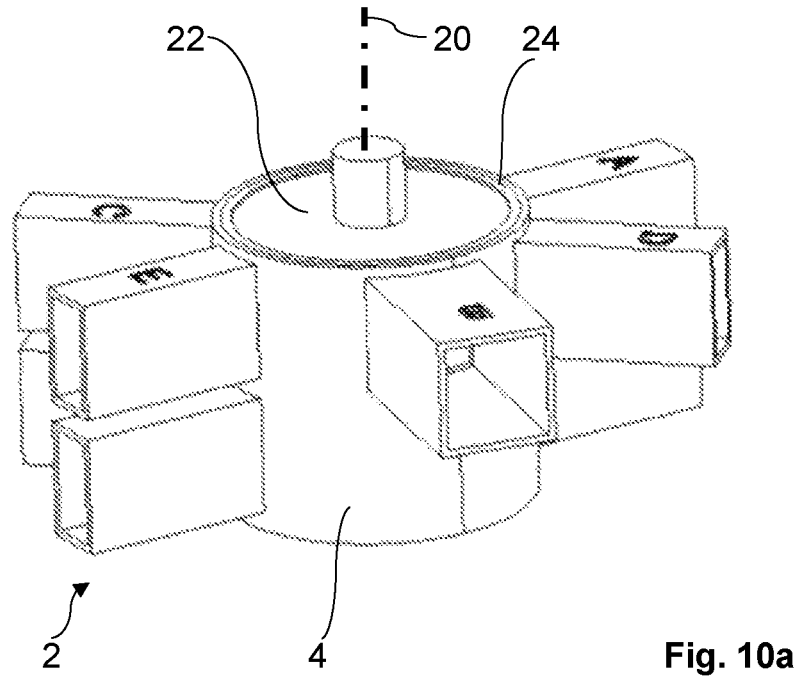
FIGS. 10a and 10b show the example in a perspective view and in a cut perspective view.
Figure 10B:
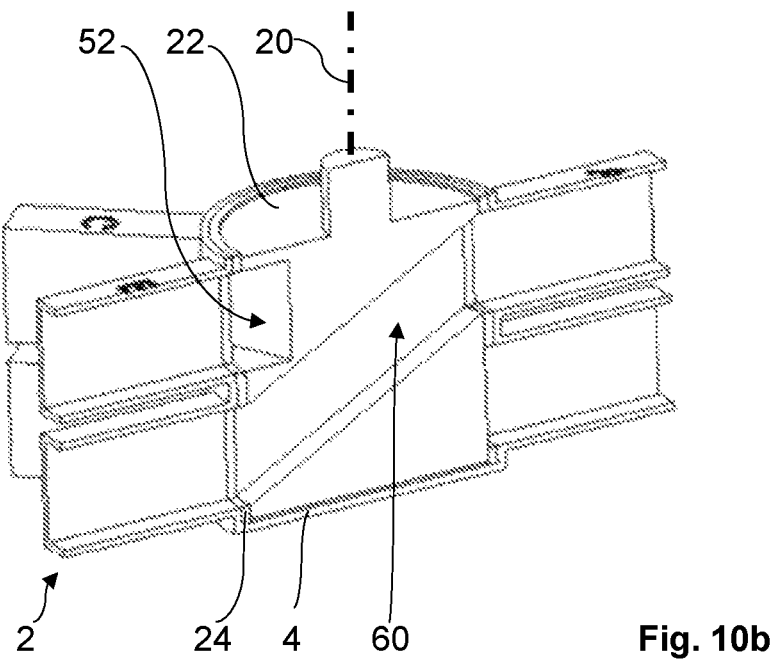
Figure 11:
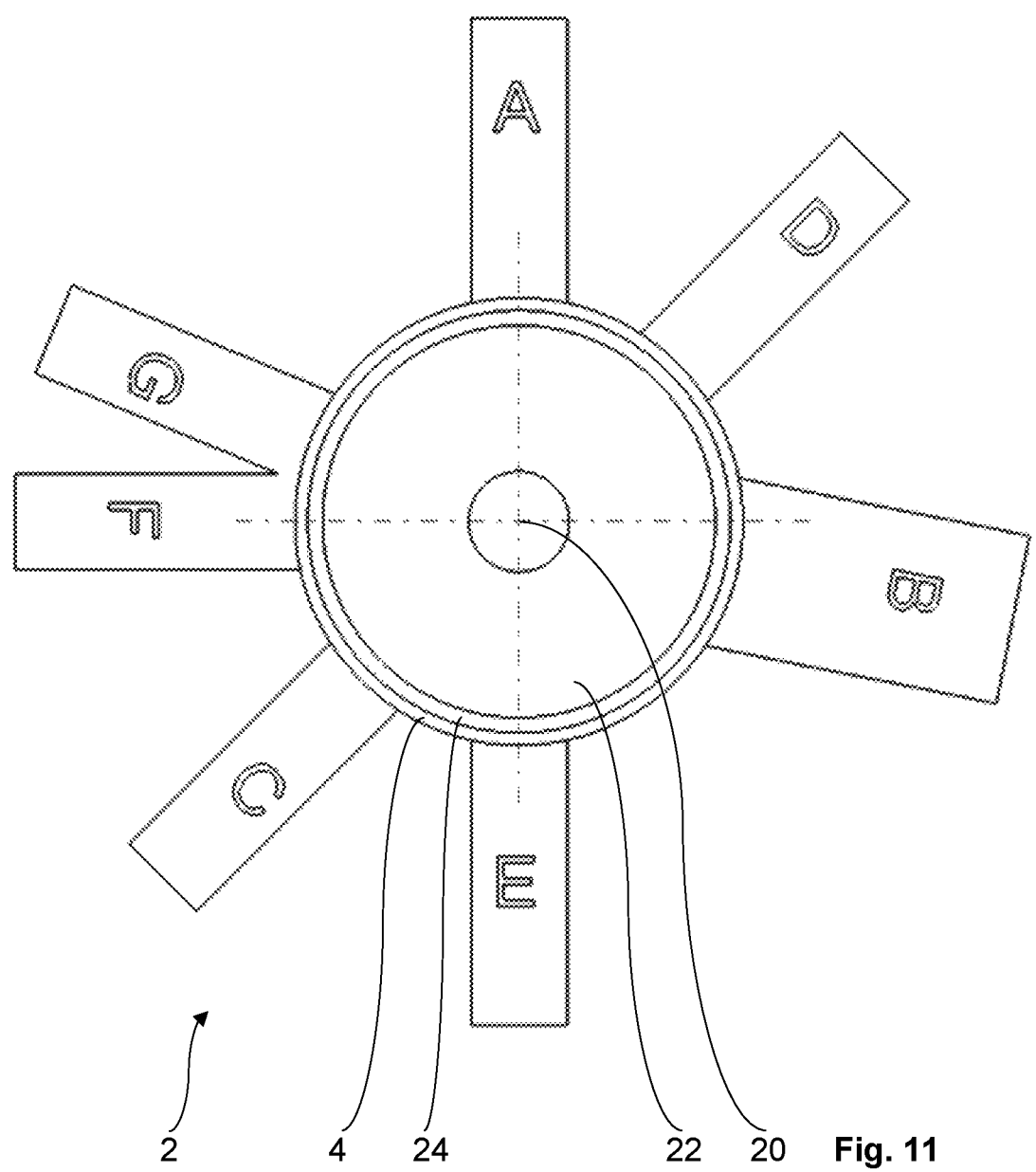
FIG. 11 shows the example in a top view.

The course of the third connection channel 60, namely its extension both over the first and second planes 40, 48 of the valve body 22, is clearly visible from FIG. 10*b*.

Figure 12A:
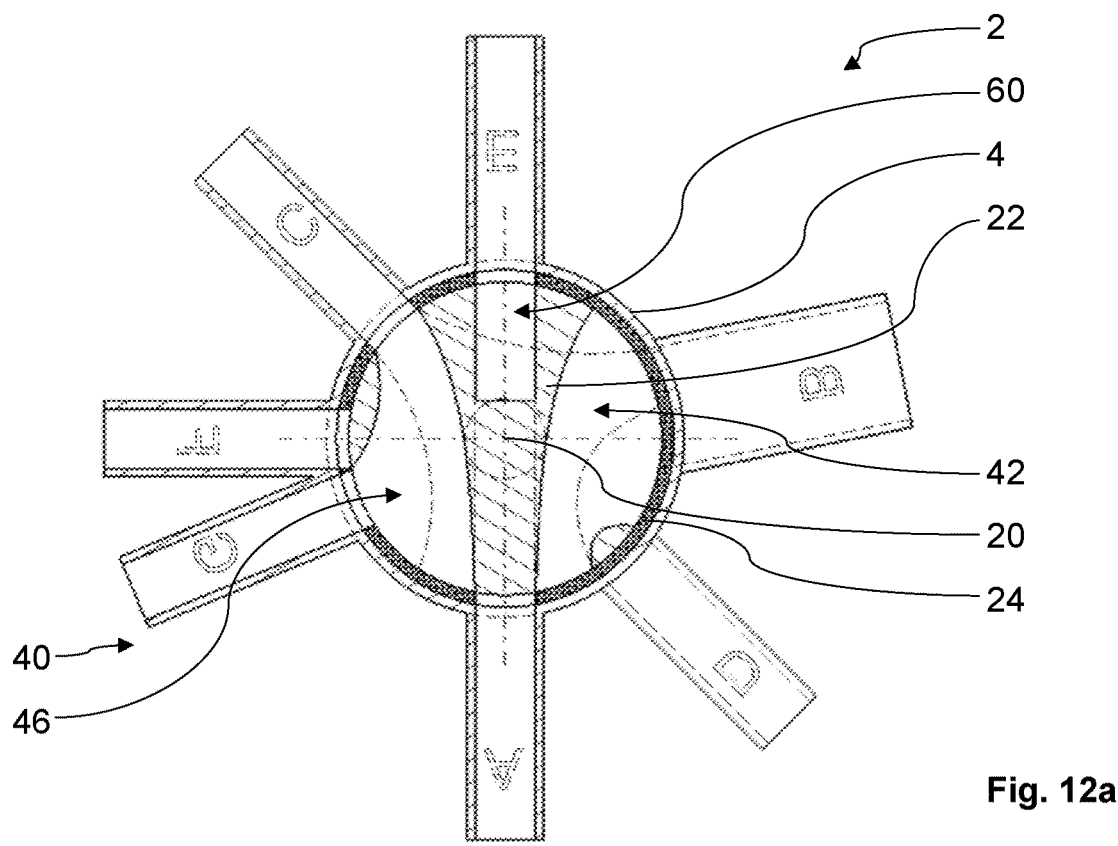
FIG. 12a shows the examples in a first cut subview, with a view to the first plane

FIG. 12*a* shows the multi-way valve 2 in a first cross-section, namely in that the first plane 40 of the valve body 22 is visible. As can be seen from this, in the first plane 40 of the valve body 22, in addition to the above-mentioned third connection channel 60, additionally two first connection channels 42, 46 are arranged. Unlike the third connection channel 60, the first connection channels 42, 46 extend only over the first plane 40 of the valve body 22.

Figure 12B:
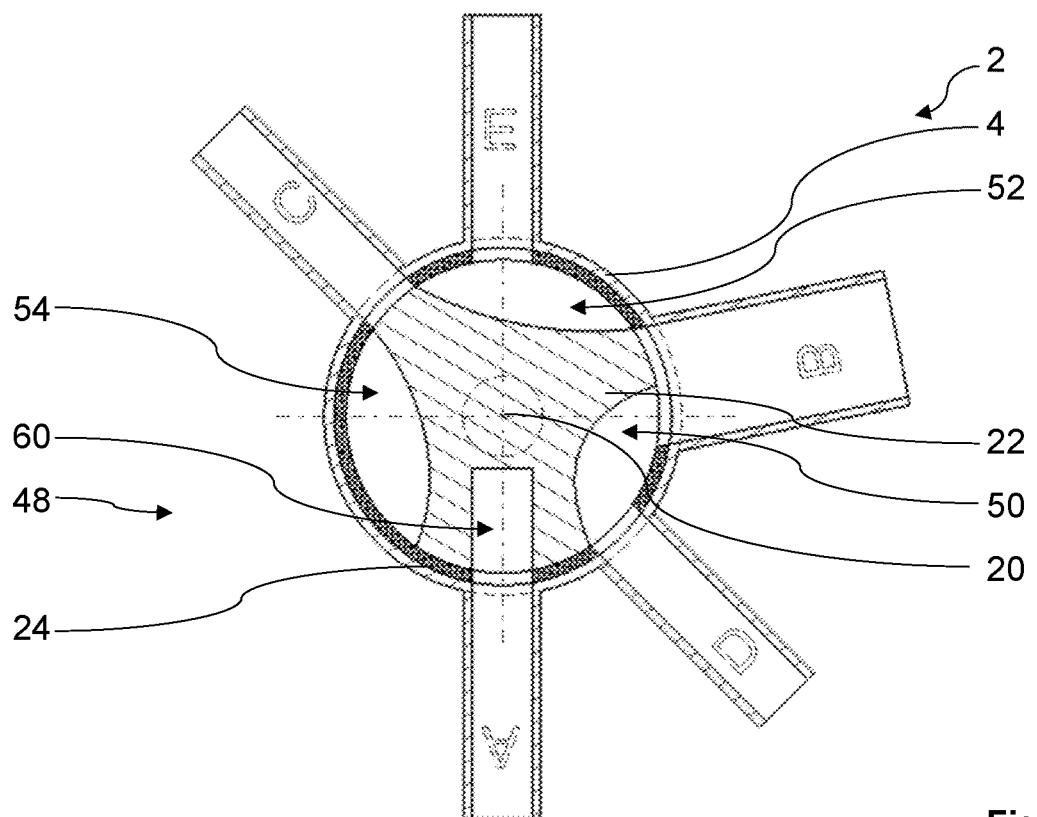
FIG. 12b shows the examples in a second cut subview, with a view to the second plane.

Analogously, FIG. 12*b* shows the multi-way valve 2 in a second cross-section, namely in that the second plane 48 of the valve body 22 is visible. As can be seen from this, in the second plane 48 of the valve body 22, in addition to the above-mentioned third connection channel 60, three additional second connection channels 50, 52, 54 are arranged. Unlike the third connection channel 60, the second connection channels 50, 52, 54 extend only over the second plane 48 of the valve body 22.

As explained in more detail below, the multi-way valve 2 according to the present second example, analogous to the first example, is designed in such a way that by means of the multi-way valve 2, simultaneously three external fluid circuits are controllable, wherein each of the three external fluid circuits are connected in a flow-conductive manner to at least two different housing openings, A at the top, A at the bottom, B, C at the top, C at the bottom, D, E at the bottom, F and G, by means of the external flow channels. In an exemplary manner, at least one of the three external fluid circuits may have an external flow channel formed as a bypass channel for at least one component of this external fluid circuit, wherein the bypass channel may be flow-conductively connected separately at one of the housing openings, A top, A bottom, B, C top, C bottom, D, E top, E bottom, F and G, of the multi-way valve 2.

In the following, the functionality of the multi-way valve according to the invention is explained in more detail according to the present embodiment on the basis of FIGS. 9*a* to 12*b*.

For example, by means of the multi-way valve 2 in its rotary position shown in FIGS. 12*a* and 12*b*, the housing openings C bottom and G are connected in respect of flow by means of the corresponding seal openings of the seal 24 and the first connection channel 46, the housing openings E bottom and A top are connected in respect of flow by means of the corresponding seal openings of the seal 24 and the third connection channel 60, and the housing openings B and D are connected in respect of flow by means of the corresponding seal openings of the seal 24 and the second connection channel 50. In this respect, also see FIG. 10*b*. The remaining housing openings, namely the housing openings, A at the bottom, F, C at the top and E at the top, are blocked by means of the valve body 22, as can be seen from FIGS. 12*a* and 1*b*.

Analogous to the first example, by means of the multi-way valve 2 of the second example, a large number of further flow-conductive connections between at least two of the housing openings, A top, A bottom, B, C top, C bottom, D, E top, E bottom, F and G, can be produced or separated, i.e., blocked. Accordingly, the above explanations are purely exemplary. Thus, also by means of the multi-way valve 2 according to the second example, a variety of different flow connections between external flow channels of external fluid circuits can be established or separated from each other.

As can be seen from the above examples, it is possible by means of the multi-way valve according to the invention to connect the three external fluid circuits in a variety of possible combinations, for example, with each other, i.e., to connect them with each other in respect of flow. The multi-way valve according to the invention makes it possible to close or open the external fluid circuits in each case, to connect them with each other or to separate them from each other.

The invention is not limited to the present embodiments. For example, the invention is also advantageously applicable to other land vehicles, aircraft and naval vehicles and in other areas of technology. Furthermore, it is possible to form the multi-way valve according to the invention in a design other than the ones in the present embodiment. For example, the seal may be formed as an integral part of the housing and/or the valve body.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A multi-way valve comprising:
 a housing having housing openings each for flow-conductive connection to an external flow channel for a fluid;
 a valve body arranged in the housing so as to be rotatable about a rotation axis for flow-conductive connection of the housing openings of the housing; and a seal having seal openings corresponding to the housing openings in the housing, for sealing the flow-conductive connections from the open environment, is arranged between the housing and the valve body, wherein the valve body has connections channels including first connection channels and second connection channels, wherein a first plane of the valve body has the first connection channels and a second plane of the valve body has the second connection channels, the second plane being arranged substantially parallel to the first plane, wherein the connection channels are separate from each other in respect of flow and are adapted to be flow-conductively connected to at least two of the housing openings of the housing via a rotation of the valve body to a previously specified rotary position of the valve body, and wherein at least one of the housing openings in the housing is flow-conductively connected to at least one of the first connection channels of the first plane and to at least one of the second connection channels of the second plane.

2. The multi-way valve according to claim 1, wherein the first connection channels include three first connection channels and wherein the second connection channels include three second connection channels.

3. The multi-way valve according to claim 1, wherein, some of the first connection channels and/or some of the second connection channels are each formed as a curved or arc-shaped recess of the valve body.

4. The multi-way valve according to claim 1, wherein the multi-way valve is designed such that via the multi-way valve, simultaneously three external fluid circuits are controlled, wherein each of the three external fluid circuits is flow-conductively connected by the external flow channels to at least two different housing openings or wherein at least one of the three external fluid circuits has an external flow channel formed as a bypass channel for at least one component of the at least one of the three external fluid circuits, and wherein the bypass channel is flow-conductively connected separately at one of the housing openings of the multi-way valve.

5. The multi-way valve according to claim 1, wherein the seal is an integral part of the housing and/or the valve body.

6. The multi-way valve according to claim 1, wherein the seal is a separate component of the multi-way valve.

7. The multi-way valve according to claim 1, wherein the valve body is one piece.

8. The multi-way valve according to claim 1, wherein the first plane and the second plane each extend perpendicular to the rotation axis.

9. A multi-way valve comprising:
a housing having housing openings each for flow-conductive connection to an external flow channel for a fluid;
a valve body arranged in the housing so as to be rotatable about a rotation axis for flow-conductive connection of the housing openings of the housing; and
a seal having seal openings corresponding to the housing openings in the housing, for sealing the flow-conductive connections from the open environment, is arranged between the housing and the valve body,
wherein the valve body has connections channels including first connection channels and second connection channels, wherein a first plane of the valve body has the first connection channels and a second plane of the valve body has the second connection channels, the second plane being arranged substantially parallel to the first plane,
wherein the connection channels are separate from each other in respect of flow and are adapted to be flow-conductively connected to at least two of the housing openings of the housing via a rotation of the valve body to a previously specified rotary position of the valve body, and
wherein, one of the first connection channels and/or one of the second connection channels is formed as a central channel, wherein remaining channels of the first connection channels and/or remaining channels of the second connection channels are each arranged on both sides of the central channel.

10. The multi-way valve according to claim 9, wherein, the remaining channels of the first connection channels and/or the remaining channels of the second connection channels arranged in each case on both sides of the central channel are each formed as a curved or arc-shaped recess of the valve body.

11. A multi-way valve comprising:
a housing having housing openings each for flow-conductive connection to an external flow channel for a fluid;
a valve body arranged in the housing so as to be rotatable about a rotation axis for flow-conductive connection of the housing openings of the housing; and
a seal having seal openings corresponding to the housing openings in the housing, for sealing the flow-conductive connections from the open environment, is arranged between the housing and the valve body,
wherein the valve body has connections channels including at least one first connection channel and at least one second connection channel, wherein a first plane of the valve body has the at least one first connection channel and a second plane of the valve body has the at least one second connection channel, the second plane being arranged substantially parallel to the first plane,
wherein the connection channels are separate from each other in respect of flow and are adapted to be flow-conductively connected to at least two of the housing openings of the housing via a rotation of the valve body to a previously specified rotary position of the valve body, and
wherein the valve body has at least one third connection channel that is separate in respect of flow from the at least one first connection channel and the at least one second connection channel, and wherein the at least one third connection channel extends over the first and second planes such that the at least one third connection channel is formed as a central channel.

12. The multi-way valve according to claim 11, wherein the housing openings, the seal openings and the connection channels are arranged such that the housing openings and the seal openings are adapted to be flow-conductively connected, at least partially, to the at least one first connection channel, the at least one second connection channel and the at least one third connection channel or partly with the at least one first connection channel or partly with the at least one second connection channel or partly with the at least one third connection channel and/or partly simultaneously with the at least one first connection channel and the at least one second connection channel.

* * * * *